United States Patent [19]

Falconer et al.

[11] Patent Number: 4,880,106

[45] Date of Patent: Nov. 14, 1989

[54] ELECTROMAGNETIC VIBRATORY FEEDER

[75] Inventors: Thomas H. Falconer; William H. Benson, both of Erie, Pa.

[73] Assignee: Eriez Manufacturing Company, Erie, Pa.

[21] Appl. No.: 195,862

[22] Filed: May 19, 1988

[51] Int. Cl.⁴ .............................................. B65G 27/08
[52] U.S. Cl. .................................................... 198/763
[58] Field of Search ............... 198/759, 760, 763, 767, 198/769, 770; 267/136, 137, 160

[56] References Cited

U.S. PATENT DOCUMENTS 4,121,708 10/1978 Benson et al. ........................ 198/767
4,260,052 4/1981 Brown .................................. 198/763

FOREIGN PATENT DOCUMENTS 823857 11/1959 United Kingdom ................ 198/763

Primary Examiner—Joseph E. Valenza
Attorney, Agent, or Firm—Charles L. Lovercheck; Wayne L. Lovercheck; Dale R. Lovercheck

[57] ABSTRACT

A vibratory feeder having a tray with a conveying surface and springs. The springs are each made up of flat plate like first leaves and flat plate like second leaves rigidly attached together. One part of each spring is connected to the tray and the other part is connected to the base. The longitudinal axis of the leaves extend perpendicular to the longitudinal axis of the tray. The springs are spaced from each other whereby the tray is vibrated in an arcuate path relative to the base to vibrate the tray for moving material on the tray.

10 Claims, 3 Drawing Sheets

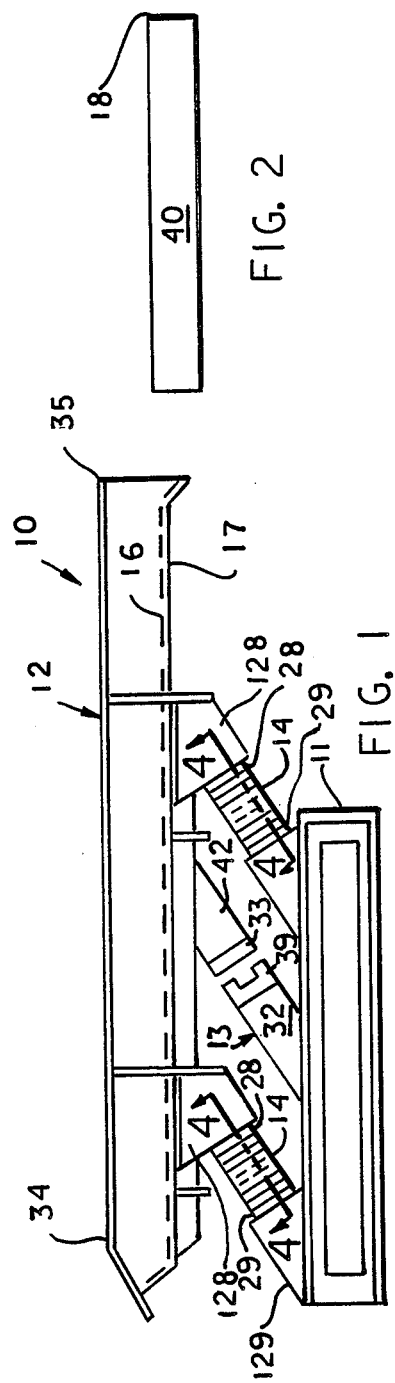
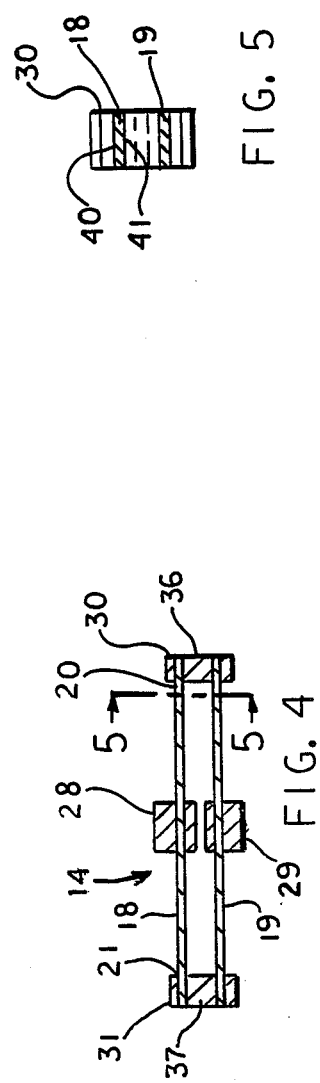

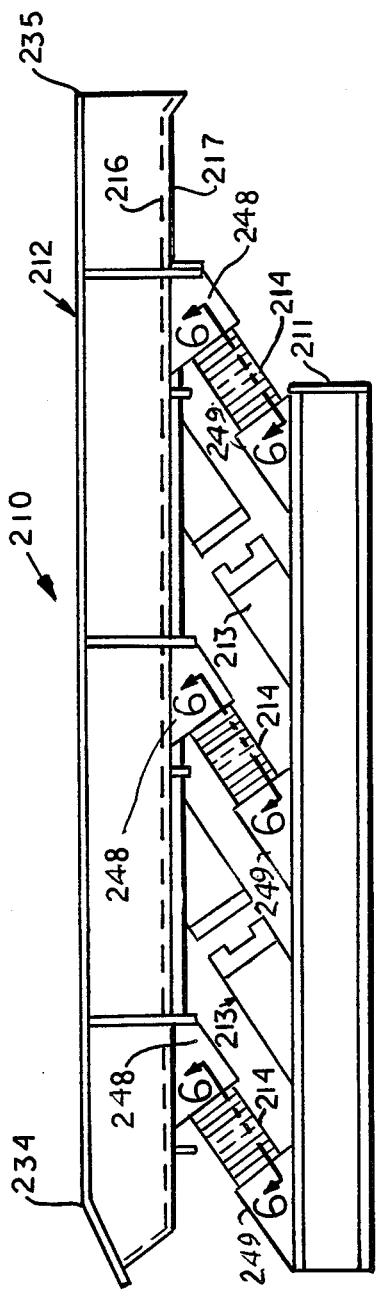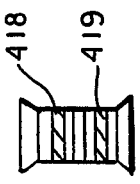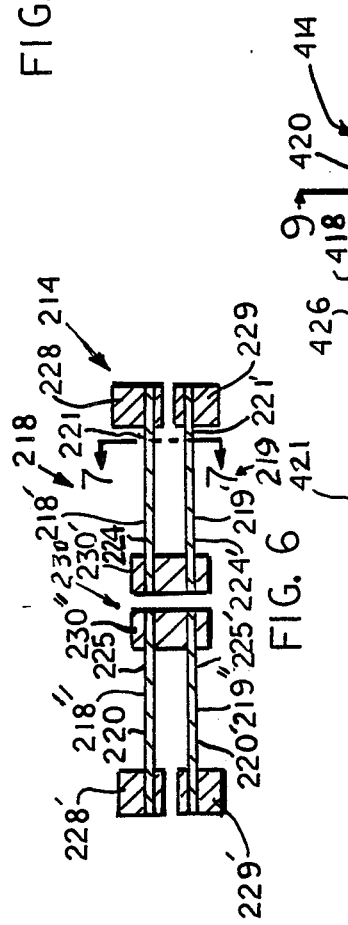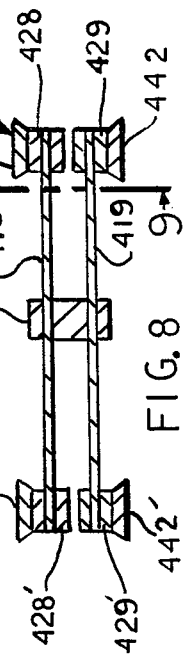

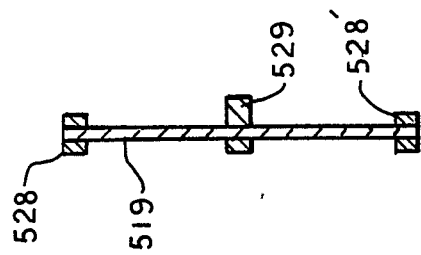
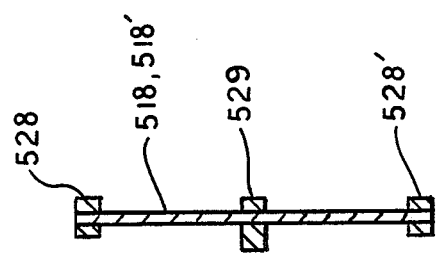
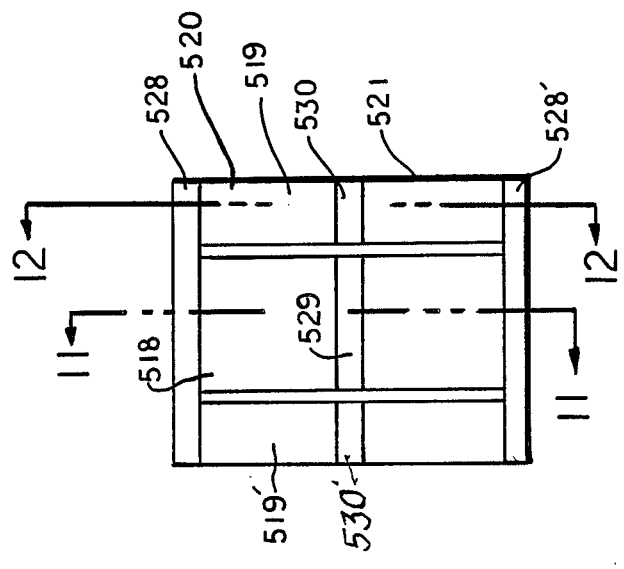

ELECTROMAGNETIC VIBRATORY FEEDER

BACKGROUND OF THE INVENTION

These feeders consist of a tray mass connected by a spring system to a driver mass. They are tuned to have a natural frequency close to their operating frequency.

There are basically two types of vibratory feeders. One type is commonly referred to as an electromechanical vibratory feeder. It consists of a tray mass connected by springs to a base mass on which is mounted a motor with rotating eccentric weights. The other type of vibratory feeder is the electromagnetic type. Rather than using eccentric weights to generate the driving force it utilizes an electromagnet. Because of this difference in generating the driving force the mathematical equations of motion are different for these two types of feeders. This disclosure deals with the electromagnetic type vibratory feeder.

REFERENCE TO PRIOR ART

Prior to 1976 electromechanical feeders utilized steel coil springs, rubber springs or air springs. The required high deflection of the feeders prevented the use of leaf springs.

In 1977 Eriez Magnetics filed an application for a patent on a loop (or folded) spring system which would permit the use of leaf springs on electromechanical feeders operating at high deflections. U.S. Pat. No. 4,121,708 was issued on Oct. 24, 1978 to William H. Benson and Thomas H. Falconer and assigned Mar. 8, 1975 to Eriez Magnetics. U.S. Pat. No. 4,121,708 shows an electromechanical feeder with a rectangular frame, referred to in that Patent by the numeral 4, having two sides and two ends defining a rectangular opening. In the Benson Patent, a vibratory motor 2 is suspended in an opening in the frame by four springs. Each spring is shown in that patent as having a leaf 11 and another leaf 12. An intermediate part of the leaf 11 of each spring is fixed to an end of the frame 4 and an intermediate part of the leaf 12 of each spring is fixed to the vibratory motor 2. A conveyer 1 having a tray 30 is fixed to one end of the frame 4. U.S. Pat. No. 4,121,708 could not be used with an electromagnetic drive motor without completely redesigning the frame 4 suspension system tray support and tray.

GENERAL STATEMENT OF THE INVENTION

Applicant has provided an improvement in electromagnetic feeders by using an arrangement of loop springs by which a vibratory feeder tray can be vibrated through cycles having excursions of greater magnitude than was previously possible using leaf springs. Prior to the invention strokes of the tray of electromagnetic feeders using leaf spring were generally limited to about 0.070 inch because of stress induced in the spring.

With the spring arrangement according to the present invention electromagnetic feeders can have the following advantages: (1) strokes of the tray can be increased substantially from the existing approximately 0.070 inch limit with a corresponding increase in capacity; (2) higher strokes of the driver are also possible which could result in a reduction of the weight of the driver thus making it less costly; (3) the concepts of the invention shown lend themselves to modular construction relative to the electromagnets. If the tray is made longer or wider or a liner is placed in the tray additional magnets can be added to provide the necessary motor force as shown in FIG. 3 of this application; (4) the concepts of the invention shown lend themselves to modular construction relative to the spring system. If the tray is made wider or longer or if a liner is added additional spring systems can be added to compensate for the increased weight as shown in FIG. 3 which can provide an economic advantage over the present practice of adding additional drivers; and (5) if a particular application requires the addition of weight to the tray such as a liner or tray cover a compensating weight can easily be added to the driver mass of the configurations shown in the FIGURES of drawings hereof.

The following features of the spring system are:
a. Much higher peak-to-peak deflections and resulting greater feed rates are now possible and practical.
b. Relatively small space is required due to the "folded" nature of the springs and the improved feeder design.
c. The system lends itself well to modularity because the springs can be put together in "sets" that can be easily installed or removed as one piece as for manufacture and maintenance; modularity is also practical with electromagnet "sets".
d. The motion of the two vibrating bodies is strictly straight line with respect to one another; this lends to easier control of tray motion and feed rates.
e. Stress-strain curves are essentially straight line within the bounds of practical peak-to-peak deflection values.
f. Spring stresses are minimized because of the large effective length of the springs; this results in less spring breakage.
g. Spring sets and drive units can be easily added or subtracted according to the needs of the application.

An advantage of the embodiment of spring shown in FIGS. 10 11 and 12 is that the spring is well adapted to being used in applications where "flatness" of the spring assembly is necessary or desirable. The spring elements are, in this case, folded back upon one another sideways to provide large effective spring length in a small space flatwise.

OBJECTS OF THE INVENTION

It is an object of the present invention to provide an improved electromagnetic feeder with loop type springs supporting the tray on the base.

Another object of the invention is to provide an improved vibratory feeder having substantially increased peak-to-peak deflection over what is presently possible and practical in a given size of feeder.

Another object of the invention is to provide modular magnetic motor and springing units in a vibratory feeder for convenient change as needed.

With the above and other objects in view the present invention consists of the combination and arrangement of parts hereinafter more fully described and illustrated in the accompanying drawings and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a side view of an electromagnetic feeder according to the invention.

FIG. 2 is a top view of a leaf of one of the springs according to the invention.

FIG. 3 is a side view of another embodiment of an electromagnetic feeder using two electromagnets and three sets of springs.

FIG. 4 is a cross sectional view taken on line 4—4 of FIG. 1.

FIG. 5 is a cross sectional view taken on line 5—5 of FIG. 4.

FIG. 6 is a cross sectional view taken on line 6—6 of FIG. 3.

FIG. 7 is a cross sectional view taken on line 7—7 of FIG. 6.

FIG. 8 is a cross sectional view similar to FIG. 6 of another embodiment of the spring.

FIG. 9 is a cross sectional view taken on line 9—9 of FIG. 8.

FIG. 10 is a front view of another embodiment of the spring used in combination with a feeder according to the invention.

FIG. 11 is a cross sectional view taken on line 11—11 of FIG. 10

FIG. 12 is a cross sectional view taken on line 12—12 of FIG. 10.

DETAILED DESCRIPTION OF THE INVENTION

Now with more particular reference to the drawings FIGS. 1 and 3 show two examples of the use of springs like those disclosed in combination with vibratory feeders according to the invention. Feeder trays could be supported by two or more sets of springs as shown for example in the embodiments of FIGS. 1 and 3 and have one or more electromagnets.

FIGS. 4 through 12 show four different embodiments of the spring systems that can be used to support feeder trays of feeders as shown in FIGS. 1 and 3.

Now with more specific reference to the embodiment of the invention shown in FIG. 1 and the spring shown by way of example in FIGS. 2, 4 and 5, an electromagnetic vibratory feeder 10 is shown having a base 11 and a tray 12. The tray 12 has an electromagnet vibrator constituting the electromagnetic driver 13. The electromagnet driver 13 may be one of several types familiar to those skilled in the art. For example, the driver may be of the type shown in U.S. Pat. No. 3,322,260 to Schwenzfeier. The driver 13 includes an armature 33 and a solenoid 39. The electromagnet of driver 13 in FIG. 1 has a solenoid 39 fixed to a bracket 32 which is fixed to base 11. Armature 33 is fixed to bracket 42 which is in turn fixed to tray 12.

The tray 12 has a bottom 17 disposed generally horizontally. Tray bottom 17 has a bottom conveying surface 16. Tray 12 is supported on base 11 by springs 14. The springs 14, shown for example in FIG. 1, may be made like the spring shown in detail in FIGS. 2, 4 and 5. However, the springs could be made like any of the embodiments shown in this disclosure. The springs 14 are each made up of a first leaf 18 and a second leaf 19. Leaf 19 may be identical to first leaf 18. Each of the spring leaves 18 and 19 have a first flat planar side 40 and a second flat planar side 41 that are generally parallel to each other. Leaves 18 and 19 are clamped together rigidly at their first end 20 by clamping means 30.

The second end 21 of leaves 18 and 19 are rigidly clamped together by clamping means 31. Clamping means 30 may include a spacer 36 and clamping means 31 may include a spacer 37 between the ends of the respective leaves.

The intermediate part of the leaf 18 of each spring 14 is fixed to a spring support bracket 128 by clamp 29 and the intermediate part of the leaf 19 of each spring 14 is fixed to another spring support bracket 129 by clamp 29. Spaced spring supports 128 are fixed to the tray and spaced spring support bracket 129 are fixed to the base.

Brackets 128 and 129 are fixed to the tray bottom 17 and base 11 respectively at a horizontal side. The lower ends of the brackets 129 are inclined downward and toward the discharge end 135 of the feeder tray at an acute angle to the bottom surface 16 of the tray.

FIG. 3 shows a feeder 210 having three tray support springs 214 and two drivers including electromagnets 213. The feeder 210 could have springs similar to the springs shown in any of the several embodiments of springs disclosed in this application. The feeder 210 has base 211 and tray 212. Tray 212 has loading end 234 and discharge end 235. The electromagnets 213 may be similar to the electromagnet driver of FIG. 1. Likewise, the brackets 248 are similar to brackets 128 and 129 of the embodiment of FIG. 1, as well as the brackets attaching the electromagnets to the tray and base, are similar to the corresponding parts of FIG. 1.

In the embodiment of the spring shown in FIGS. 6 and 7, as specifically shown as applied to FIG. 3, but could be applied to a feeder with any suitable number of springs, the springs 214 each have first leaf 218 and second leaf 219. First leaf 218 of each spring is divided into a first part 218' and a second part 218". Second leaf 219 is divided into a first part 219' and a second part 219". First part 218' of leaf 218 has an outer end 221 and an inner end 224. Second part 218' of first leaf 218 has an outer end 220 and an inner end 225. First part 219' of leaf 219 has an outer end 221' and an inner end 224'. Second part 219" of leaf 219 has an outer end 220' and an inner end 225'. Inner end 224 of first part 218', of first leaf 218, and inner end 224' of first part 219', of second leaf 219, are rigidly clamped together by clamping means 230'. Inner end 225 of second part 218", of leaf 218, is rigidly clamped to inner end 225', of second part 219', of leaf 219, by clamping means 230".

Laterally and longitudinally spaced brackets 248 are fixed to tray 212. Laterally and longitudinally spaced brackets 249 are fixed to base 211. Each clamping means 228 and 228' are fixed to a tray bracket 248 and each clamping means 229 and 229' are fixed to a spring support bracket 249.

The embodiment of the spring shown in FIGS. 8 and 9 is similar to the embodiments shown in FIGS. 6 and 7 but leaves 418 and 419 are not divided as in FIGS. 6 and 7 but are each made up of a single leaf element. The intermediate parts of the spring leaves 418 and 419 are clamped together by clamp 426. The spring 414 is made up of spring leaves 418 and 419. The outer ends of leaf 418 may be clamped to a bracket on feeder tray by clamping means 428 and 428' through elastomer members 420 and 421. The outer ends of leaf 419 may be clamped to a feeder base by clamping means 429 and 429' through elastomer members 442 and 442'. The elastomer members 420, 421, 442 and 442' can be relatively rigid rubber or a material having properties which will provide a limited amount of damping of feeder vibrations when such damping is required in the feeder application. The elastomer material also compensates for the difference in length between the straight line distance between the ends of leaves 418 and 419 when they are straight and when they are bent during a cycle of vibration. This is important because the ends of the leaves 418 and 419 are clamped to rigid members, namely, the feeder base and tray.

The embodiment of the spring shown in FIGS. 10, 11 and 12 is similar to the embodiment of the other figures of drawing in that it utilizes loop springs. The spring consists of first leaf 518, second leaf 519 and third leaf 519', laid side by side in a common plane. The ends of the leaves 518, 519 and 519' are rigidly clamped together by clamping means 528 and 528'. The intermediate parts of the first leaf 518 may be clamped to suitable tray brackets by clamping means 529. Second leaf 519 and third leaf 519' may be clamped to a base by clamping means 530 and 530'. However, the clamping menns 529 could be clamped to the base and the clamping means 530 and 530' could be clamped to the tray.

The foregoing specification sets forth the invention in its preferred, practical forms but the structure shown is capable of modification within a range of equivalents without departing from the invention which is to be understood to be broadly novel as is commensurate with the appended claims.

The embodiments of the invention in which an exclusive property or privilege is claimed are defined as follows:

1. In combination, a feeder comprising a base, a tray, having a bottom with a planar conveying surface,
   said bottom having a longitudinal axis, a loading end, and a discharge end,
   driver means connected to said base and to said tray,
   at least a first spring and a second spring spaced from one another and supporting said tray on said base,
   each said spring comprising at least a first elongated flat plate like leaf and a second elongated flat plate like leaf,
   each said leaf having two flat planar sides disposed generally parallel to one another and inclined at an acute angle to said conveying surface,
   said elongated leaves each having a longitudinal axis extending laterally of said tray longitudinal axis,
   first clamping means rigidly clamping said first leaf of each said spring to said second leaf of each said spring,
   second clamping means rigidly clamping said first leaf of each said first spring to said bottom of said tray, at a position spaced from said first clamping means,
   third clamping means rigidly clamping said second leaf of each said spring to said base, at a position opposite said first clamping means and spaced from said first clamping means and said second clamping means, whereby said first leaf and said second leaf are adapted to act as cantilever springs supporting said tray on said base for vibration by said driver means, thereby conveying articles supported on said tray surface,
   said first clamping means being spaced laterally from said second clamping means and said third clamping means.

2. The combination recited in claim 1 wherein each said leaf has a first end, a second end and an intermediate part,
   said first clamping means rigidly clamping said first end of said first leaf of each said spring to said first end of said second leaf of each said spring,
   said second clamping means rigidly clamping said intermediate part of each said first leaf of each said spring to said tray,
   said third clamping means rigidly clamping said intermediate part of each said second leaf to said base,
   and fourth clamping means rigidly clamping said second end of said first leaf of each said spring to said second end of said second leaf of the particular said spring.

3. The combination recited in claim 1 wherein each said leaf of each said spring has a first end, a second end and an intermediate part,
   said first clamping means rigidly clamping said intermediate part of said first leaf of each said spring to said intermediate part of said second leaf of each said spring,
   said second clamping means rigidly clamping said first end of said first leaf of each said spring to said tray,
   said third clamping means rigidly clamping said first end of said second leaf of each said spring to said base,
   fourth clamping means rigidly clamping said second end of said first leaf of each said spring to said tray and
   fifth clamping means rigidly clamping said second end of said second leaf of each said spring to said base.

4. The combination recited in claim 3 wherein said first leaf and said second leaf of each said spring are divided into a first part and a second part,
   said first part of said first leaf having an outer end and an inner end,
   said second part of said first leaf having an outer end and an inner end,
   said second leaf having a first part and a second part,
   said first part of said second leaf having an outer end and an inner end,
   said first clamping means having a first part and a second part,
   said first part of said first clamping means rigidly clamping said inner end of said first part of said first leaf to said inner end of said first part of said second leaf,
   said second part of said first clamping means rigidly clamping said inner end of said second part of said first leaf to said inner end of said second part of said second leaf, whereby said inner end of said first part of said first leaf of said each said spring, and said inner part of said second leaf of said springs vibrate together,
   and said second part of said first leaf and said inner end of said second part of said second leaf vibrate together and independent of said inner ends of said first part of said first leaf and said second leaf.

5. The combination recited in claim 3 wherein first elastomer means is disposed between said second clamping means and said tray,
   second elastomer means is disposed between said third clamping means and said base,
   third elastomer means is disposed between said fourth clamping means and said tray,
   fourth elastomer means is disposed between said fifth clamping means and said base, whereby said inner ends of said parts of said spring leaves can move relative to one another in all directions.

6. The combination recited in claim 1 wherein said driver is an electromagnetic driver having a solenoid attached to said base, and an armature attached to said tray.

7. The combination, recited in claim 1 wherein said longitudinal axis of said tray extends through said loading end and through discharge end.

8. The combination recited in claim 1 wherein said feeder has a third spring similar to said first spring, and a second driver is disposed between said second spring and said third spring.

9. The feeder recited in claim 1 wherein said first leaf of each said spring is clamped to said feeder through a first bracket, each said first bracket having a first side fixed to said tray and a second side inclined at an acute angle to said first side and fixed to said first leaf of a particular said spring.

10. The feeder recited in claim 11 wherein each said spring is rigidly attached to said base through a second bracket, each said second bracket having a first side fixed to said base and a second side parallel to said second side of said first bracket and fixed to said second leaf of a particular said spring.

* * * * *